(12) United States Patent
Shih

(10) Patent No.: US 12,229,413 B2
(45) Date of Patent: Feb. 18, 2025

(54) METHOD AND APPARATUS FOR PERFORMING DATA FRAGMENTATION REDUCTION CONTROL OF MEMORY DEVICE IN PREDETERMINED COMMUNICATIONS ARCHITECTURE WITH AID OF FRAGMENTATION INFORMATION DETECTION, AND ASSOCIATED COMPUTER-READABLE MEDIUM

(71) Applicant: Silicon Motion, Inc., Hsinchu County (TW)

(72) Inventor: Po-Yi Shih, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 147 days.

(21) Appl. No.: 17/974,546

(22) Filed: Oct. 27, 2022

(65) Prior Publication Data
US 2024/0036739 A1    Feb. 1, 2024

Related U.S. Application Data

(60) Provisional application No. 63/392,463, filed on Jul. 26, 2022.

(51) Int. Cl.
*G06F 3/06* (2006.01)
(52) U.S. Cl.
CPC .......... *G06F 3/0619* (2013.01); *G06F 3/0659* (2013.01); *G06F 3/0679* (2013.01)
(58) Field of Classification Search
None
See application file for complete search history.

(56) References Cited

U.S. PATENT DOCUMENTS

| 2011/0099326 A1* | 4/2011 | Jung | ..................... G06F 3/0679 |
| | | | 711/E12.001 |
| 2015/0220552 A1* | 8/2015 | Duzly | ..................... G06F 16/00 |
| | | | 707/693 |

(Continued)

FOREIGN PATENT DOCUMENTS

| CN | 112650812 A | 4/2021 |
| CN | 114691535 A | 7/2022 |
| TW | 202221574 A | 6/2022 |

*Primary Examiner* — Stephanie Wu
(74) *Attorney, Agent, or Firm* — Winston Hsu

(57) ABSTRACT

A method for performing data fragmentation reduction control of a memory device in a predetermined communications architecture with aid of fragmentation information detection, associated apparatus and computer-readable medium are provided. The method may include: utilizing a memory controller to receive a first command from a host device through a transmission interface circuit of the memory controller; utilizing the memory controller to perform discontinuity-related calculation to generate a discontinuity-related calculation result for generating a data fragmentation degree, and send a first response; utilizing the memory controller to receive a second command from the host device through the transmission interface circuit; and utilizing the memory controller to send a second response to the host device through the transmission interface circuit to return the data fragmentation degree to the host device, for selectively performing data fragmentation reduction according to a determination result of the host device.

18 Claims, 5 Drawing Sheets

(56) References Cited

U.S. PATENT DOCUMENTS

| | | | |
|---|---|---|---|
| 2019/0272110 A1* | 9/2019 | Shin | G06F 11/3034 |
| 2023/0195353 A1* | 6/2023 | Zilberstein | G06F 3/0616 |
| | | | 711/154 |

* cited by examiner

METHOD AND APPARATUS FOR PERFORMING DATA FRAGMENTATION REDUCTION CONTROL OF MEMORY DEVICE IN PREDETERMINED COMMUNICATIONS ARCHITECTURE WITH AID OF FRAGMENTATION INFORMATION DETECTION, AND ASSOCIATED COMPUTER-READABLE MEDIUM

CROSS REFERENCE TO RELATED APPLICATIONS

This application claims the benefit of U.S. Provisional Application No. 63/392,463, filed on Jul. 26, 2022. The content of the application is incorporated herein by reference.

BACKGROUND OF THE INVENTION

1. Field of the Invention

The present invention is related to memory control, and more particularly, to a method and apparatus for performing data fragmentation reduction control of a memory device in a predetermined communications architecture with aid of fragmentation information detection, and an associated computer-readable medium.

2. Description of the Prior Art

A memory device may comprise Flash memory for storing data, and the management of accessing the Flash memory is complicated. For example, the memory device may be a memory card, a solid state drive (SSD), or an embedded storage device such as that conforming to Universal Flash Storage (UFS) specification. The memory device may be arranged to store files of various sizes, such as large files and small files. A single large file may be initially stored as continuous data within the memory device, but may become fragmented after long-term use such as a long time of reading and/or writing, for example, due to some behaviors of the memory device, causing the sequence read performance to be decreased. The related art tries to correct the problem, but further problems such as some side effects may be introduced. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing data fragmentation reduction control of a memory device in a predetermined communications architecture (e.g., a UFS communications architecture) with aid of fragmentation information detection, and an associated computer-readable medium, in order to solve the above-mentioned problems.

At least one embodiment of the present invention provides a method for performing data fragmentation reduction control of a memory device in a predetermined communications architecture with aid of fragmentation information detection, where the method can be applied to a memory controller of the memory device. The memory device may comprise the memory controller and a non-volatile (NV) memory, and the NV memory may comprise at least one NV memory element (e.g., one or more NV memory elements).

The method may comprise: utilizing the memory controller to receive a first command from a host device through a transmission interface circuit of the memory controller, wherein the first command carries at least one first logical address for indicating at least one first logical address region, and further carries a first indication for indicating that generating a data fragmentation degree of the at least one first logical address region is requested; in response to the first command from the host device, utilizing the memory controller to perform discontinuity-related calculation according to a plurality of first physical addresses of at least one first physical address region to generate a discontinuity-related calculation result of the plurality of first physical addresses, and generate the data fragmentation degree according to the discontinuity-related calculation result, wherein the at least one first physical address region is associated with the at least one first logical address region, and the discontinuity-related calculation result indicates a degree of discontinuity of the plurality of first physical addresses; after generating the data fragmentation degree is completed, utilizing the memory controller to send a first response to the host device through the transmission interface circuit, wherein the first response is sent to the host device in response to the first command; utilizing the memory controller to receive a second command from the host device through the transmission interface circuit, wherein the second command is arranged to indicate that returning the data fragmentation degree to the host device is requested; and in response to the second command from the host device, utilizing the memory controller to send a second response to the host device through the transmission interface circuit to return the data fragmentation degree to the host device, for selectively performing data fragmentation reduction according to a determination result of the host device, wherein the second response carries the data fragmentation degree, and the determination result is generated according to the data fragmentation degree returned to the host device.

In addition to the above method, the present invention also provides a memory controller of a memory device, where the memory device comprises the memory controller and an NV memory. The NV memory may comprise at least one NV memory element (e.g., one or more NV memory elements). In addition, the memory controller comprises a processing circuit that is arranged to control the memory controller according to a plurality of host commands from a host device, to allow the host device to access the NV memory through the memory controller, wherein the processing circuit is arranged to perform data fragmentation reduction control of the memory device in a predetermined communications architecture with aid of fragmentation information detection. The memory controller further comprises a transmission interface circuit, and the transmission interface circuit is arranged to perform communications with the host device. For example, the memory controller receives a first command from the host device through the transmission interface circuit of the memory controller, wherein the first command carries at least one first logical address for indicating at least one first logical address region, and further carries a first indication for indicating that generating a data fragmentation degree of the at least one first logical address region is requested; in response to the first command from the host device, the memory controller performs discontinuity-related calculation according to a plurality of first physical addresses of at least one first physical address region to generate a discontinuity-related calculation result of the plurality of first physical addresses, and generates the data fragmentation degree according to the discontinuity-related calculation result, wherein the at least one first physical address region is associated with the at least one first logical address region, and the discontinuity-related calculation result indicates a degree of discontinuity of the plurality of first physical addresses; after generating the data fragmentation degree is completed, the memory controller sends a first response to the host device through the transmission interface circuit, wherein the first response is sent to the host device in response to the first command; the memory controller receives a second command from the host device through the transmission interface circuit, wherein the second command is arranged to indicate that returning the data fragmentation degree to the host device is requested; and in response to the second command from the host device, the memory controller sends a second response to the host device through the transmission interface circuit to return the data fragmentation degree to the host device, for selectively performing data fragmentation reduction according to a determination result of the host device, wherein the second response carries the data fragmentation degree, and the determination result is generated according to the data fragmentation degree returned to the host device.

In addition to the method mentioned above, the present invention also provides the memory device comprising the memory controller mentioned above, wherein the memory device comprises: the NV memory, configured to store information; and the memory controller, coupled to the NV memory, configured to control operations of the memory device.

In addition to the method mentioned above, the present invention also provides an electronic device comprising the memory device mentioned above, wherein the electronic device further comprises the host device that is coupled to the memory device. The host device may comprise: at least one processor, arranged for controlling operations of the host device; and a power supply circuit, coupled to the at least one processor, arranged for providing power to the at least one processor and the memory device. In addition, the memory device provides the host device with storage space.

At least one embodiment of the present invention provides a method for performing data fragmentation reduction control of a memory device in a predetermined communications architecture with aid of fragmentation information detection, where the method can be applied to a host device coupled to the memory device. The memory device may comprise a memory controller and an NV memory, and the NV memory may comprise at least one NV memory element (e.g., one or more NV memory elements). The method may comprise: sending a first command from the host device to the memory controller through a transmission interface circuit of the host device, to trigger the memory controller to perform discontinuity-related calculation according to a plurality of first physical addresses of at least one first physical address region to generate a discontinuity-related calculation result of the plurality of first physical addresses, and generate a data fragmentation degree of at least one first logical address region according to the discontinuity-related calculation result, wherein the first command carries at least one first logical address for indicating the at least one first logical address region, and further carries a first indication for indicating that generating the data fragmentation degree of the at least one first logical address region is requested, wherein the at least one first physical address region is associated with the at least one first logical address region, and the discontinuity-related calculation result indicates a degree of discontinuity of the plurality of first physical addresses; after generating the data fragmentation degree is completed, receiving a first response from the memory controller through the transmission interface circuit, wherein the first response is sent by the memory controller to the host device in response to the first command; sending a second command from the host device to the memory controller through the transmission interface circuit, wherein the second command is arranged to indicate that returning the data fragmentation degree to the host device is requested; receiving a second response from the memory controller through the transmission interface circuit, wherein the second response is sent by the memory controller to the host device in response to the second command to return the data fragmentation degree to the host device, and the second response carries the data fragmentation degree; and generating a determination result according to the data fragmentation degree returned to the host device, for controlling the memory controller to selectively perform data fragmentation reduction according to the determination result of the host device.

In addition to the method mentioned above, the present invention also provides the host device that operates according to the method, and also provides a computer-readable medium storing a program code which causes the host device to operate according to the method when executed by the host device.

According to some embodiments, the apparatus may comprise at least one portion (e.g., a portion or all) of the electronic device. For example, the apparatus may comprise the memory controller within the memory device. In another example, the apparatus may comprise the memory device. In yet another example, the apparatus may comprise the host device. In some examples, the apparatus may comprise the electronic device.

According to some embodiments, the memory device may store data for the host device. The memory device may read the stored data in response to a host command from the host device, and provide the host device with the data read from the NV memory. In order to correct the related art problems, it is suggested that the memory device may operate according to at least one control scheme (e.g., one or more control schemes) of the method to perform associated operations, and more particularly, in response to a series of predetermined control commands (e.g., a series of predetermined data fragmentation reduction control commands) conforming to predetermined formats from the host device, detect fragmentation information and return the fragmentation information to the host device as requested by the host device.

According to some embodiments, the computer-readable medium storing a program code which causes the host device to operate according to the method when executed by the host device is provided, where the host device may send the series of predetermined control command to the memory device to control the associated operations, respectively, to enhance the overall performance.

The present invention method and apparatus can guarantee that the memory device can operate properly in various situations. For example, in response to the series of predetermined data fragmentation reduction control command, the memory device can perform the fragmentation information detection and the RDFD procedure (e.g., data reorganization garbage collection), to enhance the overall performance. In addition, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
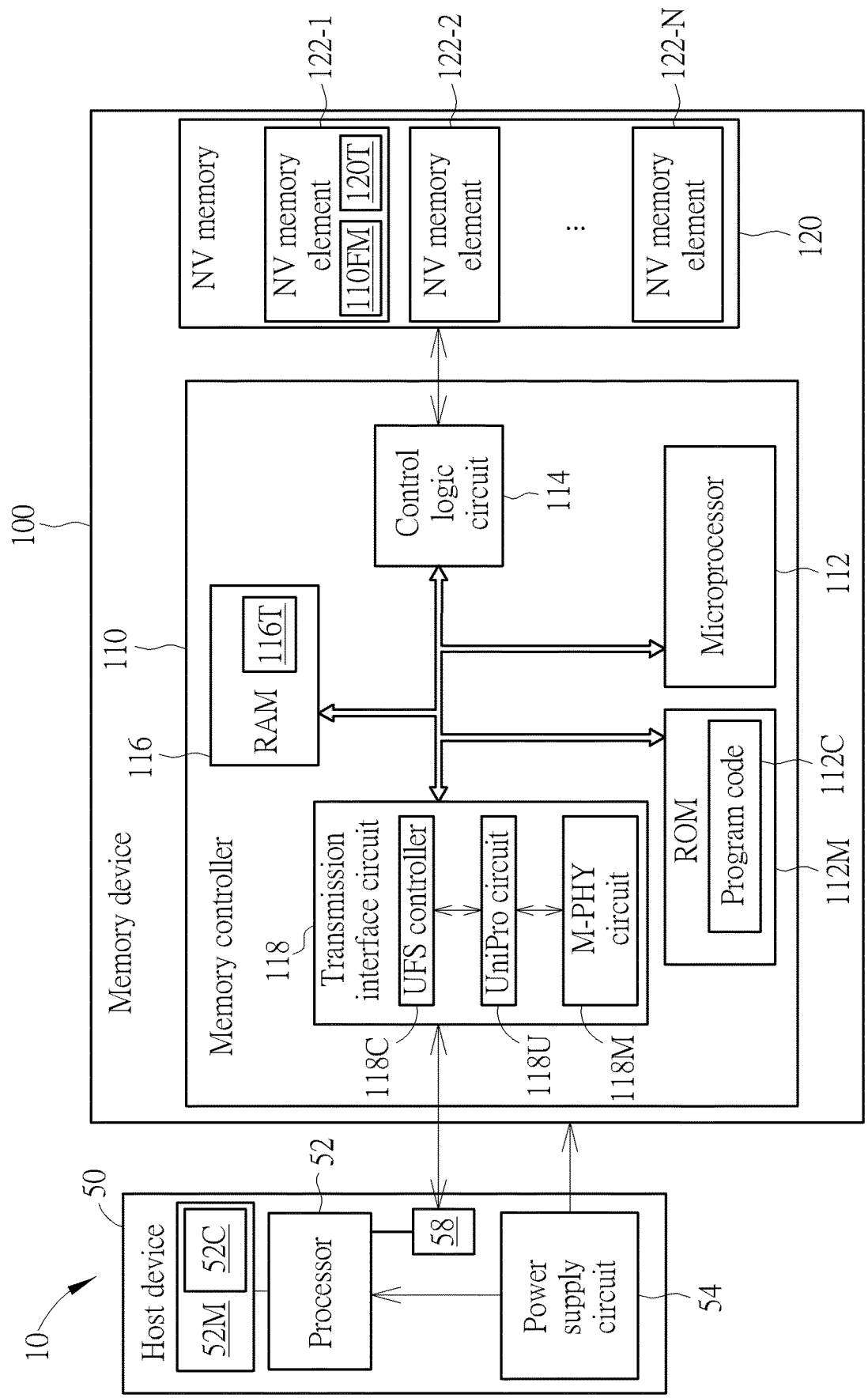
FIG. 1 is a diagram of an electronic device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g., one or more processors) which may be collectively referred to as the processor 52, a computer-readable medium 52M storing a program code 52C, a power supply circuit 54, and a transmission interface circuit 58, where the processor 52 and the transmission interface circuit 58 may be coupled to each other through a bus, and may be coupled to the power supply circuit 54 to obtain power. The processor 52 may be arranged to control operations of the host device 50, and the power supply circuit 54 may be arranged to provide the processor 52, the transmission interface circuit 58, and the memory device 100 with power, and output one or more driving voltages to the memory device 100, where the memory device 100 may provide the host device 50 with storage space, and may obtain the one or more driving voltages from the host device 50, to be the power of the memory device 100. Examples of the host device 50 may include, but are not limited to: a multifunctional mobile phone, a tablet computer, a wearable device, and a personal computer such as a desktop computer and a laptop computer. Examples of the memory device 100 may include, but are not limited to: a portable memory device (e.g., a memory card conforming to the SD/MMC, CF, MS or XD specification), a solid state drive (SSD), and various types of embedded memory devices (e.g., an embedded memory device conforming to the UFS or eMMC specification). In addition, the computer-readable medium 52M may be implemented by way of one or more hard disk drives (HDDs), one or more SSDs, etc. According to this embodiment, the memory device 100 may comprise a controller such as a memory controller 110, and may further comprise a non-volatile (NV) memory 120, where the controller is arranged to access the NV memory 120, and the NV memory 120 is arranged to store information. The NV memory 120 may comprise at least one NV memory element (e.g., one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, respectively, but the present invention is not limited thereto.

As shown in FIG. 1, the memory controller 110 may comprise a processing circuit such as a microprocessor 112, a storage unit such as a read only memory (ROM) 112M, a control logic circuit 114, a Random Access Memory (RAM) 116 (which may be implemented by way of Static Random Access Memory (SRAM), for example), and a transmission interface circuit 118, where at least one portion (e.g., a portion or all) of the above components may be coupled to one another via a bus. The RAM 116 may be arranged to provide the memory controller 110 with internal storage space (for example, may temporarily store information), but the present invention is not limited thereto. In addition, the ROM 112M of this embodiment is arranged to store a program code 112C, and the microprocessor 112 is arranged to execute the program code 112C to control the access of the NV memory 120. Please note that, the program code 112C may also be stored in the RAM 116 or any type of memory. Additionally, the control logic circuit 114 may be arranged to control the NV memory 120. The control logic circuit 114 may comprise an error correction code (ECC) circuit (not shown in FIG. 1), which may perform ECC encoding and ECC decoding, to protect data, and/or perform error correction, and the transmission interface circuit 118 may comprise multiple sub-circuits, which may interact with each other to perform communications. The transmission interface circuit 118 may conform to one or more communications specifications among various communications specifications (e.g., the Serial Advanced Technology Attachment (SATA) specification, Universal Serial Bus (USB) specification, Peripheral Component Interconnect Express (PCIe) specification, embedded Multi Media Card (eMMC) specification, and Universal Flash Storage (UFS) specification), and may perform communications with the host device 50 (e.g., the transmission interface circuit 58) according to the one or more communications specifications for the memory device 100. Similarly, the transmission interface circuit 58 may conform to the one or more communications specifications, and may perform communications with the memory device 100 (e.g., the transmission interface circuit 118) according to the one or more communications specification for the host device 50. For example, the multiple sub-circuits of the transmission interface circuit 118 may comprise a UFS controller 118C, a UniPro circuit 118U and a physical layer (PHY) circuit such as a MIPI M-PHY circuit 118M (labeled "M-PHY circuit" for brevity), and the transmission interface circuit 58 may be implemented to have a circuitry architecture (e.g., multiple corresponding sub-circuits) similar to or the same as that of the transmission interface circuit 118, but the present invention is not limited thereto.

In this embodiment, the host device 50 may transmit a plurality of host commands and corresponding logical addresses to the memory controller 110, to access the NV memory 120 within the memory device 100, indirectly. The memory controller 110 receives the plurality of host commands and the logical addresses, and translates the plurality of host commands into memory operating commands (which may be referred to as operating commands, for brevity), respectively, and further controls the NV memory 120 with the operating commands to perform reading or writing/programing upon the memory units or data pages of specific physical addresses within the NV memory 120, where the physical addresses can be associated with the logical addresses. For example, the memory controller 110 may generate or update at least one logical-to-physical (L2P) address mapping table to manage the relationships between the physical addresses and the logical addresses. The NV memory 120 may store a global L2P address mapping table 120T, for the memory controller 110 to control the memory device 100 to access data in the NV memory 120, but the present invention is not limited thereto. For example, the NV memory 120 may store multiple in-system programing (ISP) codes, for providing the memory device 100 (e.g., the memory controller 110) with various functions, respectively. The memory controller 110 may load any ISP code among the multiple ISP codes from the NV memory 120 into at least one storage region (e.g., a program code region in the RAM 116) within the memory controller 110, and the processing circuit such as the microprocessor 112 may run the any ISP code to make the memory device 100 (e.g., the memory controller 110) be equipped with a function corresponding to the any ISP code among the various functions mentioned above. For example, the any ISP code may represent a fragmentation management ISP code 110FM which causes the memory device 100 (e.g., the memory controller 110) to have a fragmentation management function when executed by the memory device 100 (e.g., the memory controller 110).

For better comprehension, the global L2P address mapping table 120T may be located in a predetermined region within the NV memory element 122-1, such as a system region, where one or more ISP codes among the multiple ISP codes, such as the fragmentation management ISP code 110FM, may be located in another predetermined region within the NV memory element 122-1, but the present invention is not limited thereto. For example, the global L2P address mapping table 120T may be divided into a plurality of local L2P address mapping tables, and the local L2P address mapping tables, as well as the multiple ISP codes, may be stored in one or more of the NV memory elements 122-1, 122-2, ..., and 122-N, and more particularly, may be stored in the NV memory elements 122-1, 122-2, ..., and 122-N, respectively. When there is a needed, the memory controller 110 may load at least one portion (e.g., a portion or all) of the global L2P address mapping table 120T into the RAM 116 or other memories. For example, the memory controller 110 may load a local L2P address mapping table among the plurality of local L2P address mapping tables into the RAM 116 to be a temporary L2P address mapping table 116T, for accessing data in the NV memory 120 according to the local L2P address mapping table which is stored as the temporary L2P address mapping table 116T, but the present invention is not limited thereto.

In addition, the aforementioned at least one NV memory element (e.g., the one or more NV memory elements such as {122-1, 122-2, ..., 122-N}) may comprise a plurality of blocks, where the minimum unit that the memory controller 110 may perform operations of erasing data on the NV memory 120 may be a block, and the minimum unit that the memory controller 110 may perform operations of writing data on the NV memory 120 may be a page, but the present invention is not limited thereto. For example, any NV memory element 122-$n$ (where "n" may represent any integer in the interval within the NV memory elements 122-1, 122-2, ..., and 122-N may comprise multiple blocks, and a block within the multiple blocks may comprise and record a specific number of pages, where the memory controller 110 may access a certain page of a certain block within the multiple blocks according to a block address and a page address.

Figure 2:
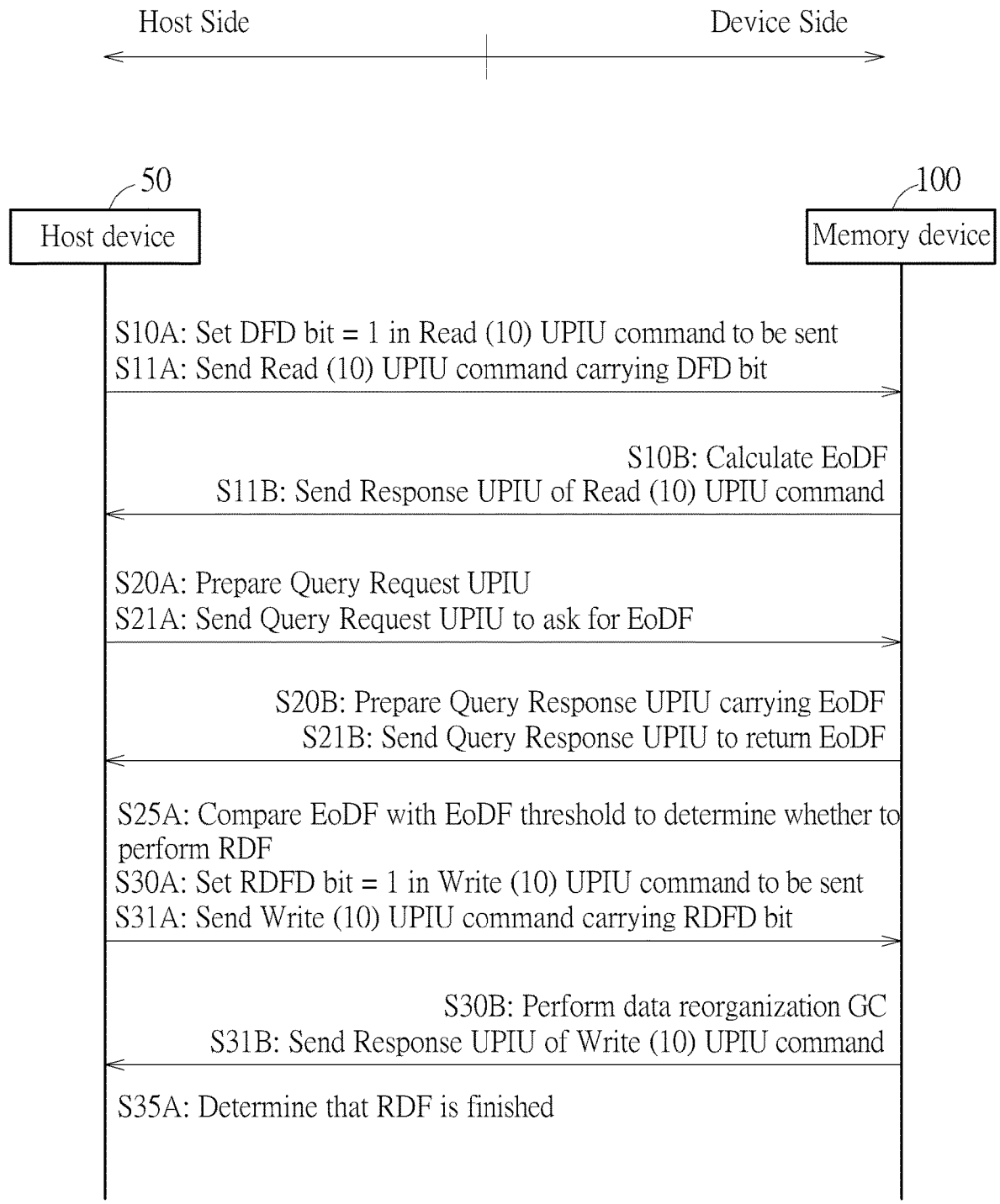
FIG. 2 illustrates a fragmentation management control scheme of a method for performing data fragmentation reduction control of a memory device in a predetermined communications architecture with aid of fragmentation information detection according to an embodiment of the present invention.

FIG. 2 illustrates a fragmentation management control scheme of a method for performing data fragmentation reduction control of a memory device such as that shown in FIG. 1 in a predetermined communications architecture (e.g., a UFS communications architecture) with aid of fragmentation information detection according to an embodiment of the present invention. The method can be applied to the architecture shown in FIG. 1, for example, the electronic device 10, the host device 50, the memory device 100, and the memory controller 110, and more particularly, the components within the memory controller 110. At the host side of the host device 50, the host device 50 (e.g., the processor 52 running the program code 52C) can be in a certain state such as an idle state, and then leave this idle state to perform the operations of Steps S10A, S11A, S20A, S21A, S25A, S30A, S31A and S35A, and enter the idle state thereof afterward. At the device side of the memory device 100, the memory device 100 (e.g., the memory controller 110, and more particularly, the microprocessor 112 running the fragmentation management ISP code 110FM) can be in a certain state such as an idle state, and then leave this idle state to perform the operations of Steps S10B, S11B, S20B, S21B, S30B and S31B, and enter the idle state thereof afterward.

In Step S10A, the host device 50 (e.g., the processor 52 running the program code 52C) can set a data fragmentation degree (DFD) bit as a first predetermined logic value such as one (labeled "DFD bit=1" for brevity) in a Read (10) UFS Protocol Information Unit (UPIU) command (e.g., the Read (10) UPIU command carrying associated information with 10 bytes) to be sent to the memory device 100 (e.g., the memory controller 110), for asking for preparing fragmentation information such as an Entropy of Data Fragmentation (EoDF), where the host device 50 can prepare the Read (10) UPIU command carrying the DFD bit in a transmitting (TX) buffer (not shown) of the host device 50.

In Step S11A, the host device 50 (e.g., the processor 52 running the program code 52C) can send the Read (10) UPIU command carrying the DFD bit to the memory device 100 (e.g., the memory controller 110) through the transmission interface circuit 58, to asking for preparing the fragmentation information such as the EoDF. For example, the Read (10) UPIU command may conform to a first predetermined command format. According to this embodiment, the Read (10) UPIU command can be taken as an example of the command for carrying the DFD bit, but the present invention is not limited thereto. According to some embodiments, the command used in the operations of Steps S10A and S11A, such as the command for carrying the DFD bit, may vary. For example, the command format of this command and/or the number of bytes for carrying the associated information of this command may vary.

For better comprehension, there can be FILE_CNT files {FILE(1), FILE(FILE_CNT)} in a file system of the memory device 100 (e.g., the file count FILE_CNT can be a positive integer), and a target file FILE(TGT) among the FILE_CNT files {FILE(1), ..., FILE(FILE_CNT)} can be a large file. The host device 50 can control the memory device 100 (e.g., the memory controller 110) by using the Read (10) UPIU command carrying the DFD bit, to prepare the EoDF EoDF(TGT) of the target file FILE(TGT). More particularly, the host device 50 can transmit a starting position such as a logical block address (LBA) (e.g., a starting LBA of the target file FILE(TGT)) and a transfer length (e.g., the size of the target file FILE(TGT)) as well as the DFD bit through the READ (10) UPIU command, and use the DFD bit to inform the memory device 100 (e.g., the memory controller 110) that the host device 50 needs to obtain the EoDF EoDF(TGT), for example, as shown in Table 1.

TABLE 1

| Byte | Bit | | | | | | | |
|------|---|---|---|---|---|---|---|---|
| | 7 | 6 | 5 | 4 | 3 | 2 | 1 | 0 |
| 0 | OPERATION CODE (28h) | | | | | | | |
| 1 | RDPROTECT = 000b | | | DPO | FUA | Reserved | FUA_NV = 0b | Obsolete |
| 2 | (MSB) | | | LOGICAL BLOCK ADDRESS | | | | |
| 3 | | | | | | | | |
| 4 | | | | | | | | |
| 5 | | | | | | | | (LSB) |
| 6 | Reserved | | DFD | | GROUP NUMBER | | | |
| 7 | (MSB) | | | TRANSFER LENGTH | | | | |
| 8 | | | | | | | | (LSB) |
| 9 | CONTROL = 00h | | | | | | | |

Table 1 illustrates an example of the first predetermined command format of the Read (10) UPIU command mentioned in Steps S10A and S11A, where there may be multiple fields in Bytes 0-9 in the first predetermined command format, and any of Bytes 0-9 may comprise Bits 7-0. Some fields of the first predetermined command format may be described as follows:

(1) the field "OPERATION CODE" may carry an operation code such as 28h (e.g., the symbol "h" indicates that the value is a hexadecimal value);

(2) the field "RDPROTECT" in Bits 7-5 of Byte 1 may carry a predetermined binary code such as 000b (e.g., the symbol "b" indicates that the value is a binary value);

(3) the field "DPO" in Bit 4 of Byte 1 may carry a Disable Page Out (DPO) parameter;

(4) the field "FUA" in Bit 3 of Byte 1 may carry a Force Unit Access (FUA) parameter;

(5) the field "FUA_NV" in Bit 1 of Byte 1 may carry another predetermined binary code such as 0b;

(6) the field "LOGICAL BLOCK ADDRESS" in Bytes 2-5, from the most significant bit (MSB) of Byte 2 to the least significant bit (LSB) of Byte 5, may carry a LBA;

(7) the field "DFD" in Bit 5 of Byte 6 may carry the DFD bit;

(8) the field "GROUP NUMBER" in Bits 4-0 of Byte 6 may carry a group number;

(9) the field "TRANSFER LENGTH" in Bytes 7-8, from the MSB of Byte 7 to the LSB of Byte 8, may carry a transfer length; and

(10) the field "CONTROL" in Byte 9 may carry a control code such as 00h;

where some other fields may be reserved (labeled "Reversed") and therefore may be regarded as reserved fields, but the present invention is not limited thereto. In addition, the DFD bit in the field "DFD" of the first predetermined command format can be regarded as a DFD flag.

As shown in Table 1, the DFD bit can be carried with the field "DFD" in Bit 5 of Byte 6, but the present invention is not limited thereto. According to some embodiments, the first predetermined command format and the location for carrying the DFD bit in the first predetermined command format may vary. For example, the field "DFD" may be moved to another location in the first predetermined command format, such as any bit among Bit 6 of Byte 6, Bit 7 of Byte 6, etc.

After receiving the Read (10) UPIU command carrying the DFD bit, the memory device 100 (e.g., the memory controller 110, and more particularly, the microprocessor 112 running the fragmentation management ISP code 110FM) can check whether the DFD bit is equal to the first predetermined logic value such as one. If Yes (e.g., DFD bit=1), the memory device 100 (e.g., the memory controller 110) can perform the fragmentation information detection to generate the fragmentation information such as the EoDF. If No (e.g., DFD bit=0), the memory device 100 (e.g., the memory controller 110) can perform a normal read operation, such as an operation of reading data.

In Step S10B, in response to the Read (10) UPIU command carrying the DFD bit (e.g., DFD bit=1), the memory device 100 (e.g., the memory controller 110, and more particularly, the microprocessor 112 running the fragmentation management ISP code 110FM) can perform the fragmentation information detection to generate the fragmentation information, and more particularly, calculate the EoDF such as the EoDF EoDF(TGT) of the target file FILE(TGT).

For better comprehension, assume that the symbol "M" may represent a number of total blocks, such as a total block count of all blocks for storing the target file FILE(TGT), and the target file FILE(TGT) is stored starting from the physical block address (PBA) PBA(0) to the PBA PBA(M) within the memory device 100 (e.g., the NV memory 120). In addition, a PBA discontinuity function DISCONT(m, m−1) of the PBAs PBA(m) and PBA(m−1) respectively associated with the LBAs LBA(m) and LBA(m−1) (e.g., continuous LBAs LBA(m−1) and LBA(m), where the LBA LBA(m) is the next LBA of the LBA LBA(m−1) among all LBAs for accessing the file system) may indicate the continuity or discontinuity between the PBAs PBA(m) and PBA(m−1). For example, the field "LOGICAL BLOCK ADDRESS" for carrying the LBA and the field "TRANSFER LENGTH" for carrying the transfer length in the first predetermined command format of the READ (10) UPIU command as shown in Table 1 may be arranged to carry the LBA LBA(0) and the file size corresponding to the total block count M. The memory device 100 (e.g., the memory controller 110) can calculate the EoDF EoDF(TGT) of the target file FILE (TGT) according to the following equations:

$$DF = \sum_{1}^{M} DISCONT(m, m-1)$$

wherein:
if the PBAs PBA(m) and PBA(m−1) are discontinuous, DISCONT(m, m−1)=1;
otherwise, DISCONT(m, m−1)=0; and $$EoDF(TGT) = \frac{DF}{M}$$

but the present invention is not limited thereto. For example, if the PBA PBA(m) is the next PBA of the PBA PBA(m−1), the memory device 100 (e.g., the memory controller 110) can determine that DISCONT(m, m−1)=0; otherwise, the memory device 100 (e.g., the memory controller 110) can determine that DISCONT(m, m−1)=1. As a result, DISCONT(m, m−1)=0 may indicate that the PBA PBA(m) is the next PBA of the PBA PBA(m−1) (e.g., the PBAs PBA(m−1) and PBA(m) are continuous PBAs), and DISCONT(m, m−1)=1 may indicate that the PBA PBA(m) is not the next PBA of the PBA PBA(m−1). In addition, as the memory controller 110 can manage the global L2P address mapping table 120T to record or update the mapping relationships between the physical addresses and the logical addresses, such as the mapping relationships between the PBAs {PBA(0), . . . , PBA(M)} and the LBAs {LBA(0), . . . , LBA(M)}, the memory controller 110 can refer to the global L2P address mapping table 120T to determine the PBAs {PBA(0), . . . , PBA(M)} according to the LBAs {LBA(0), . . . , LBA(M)}, respectively.

In Step S11B, after generating the fragmentation information such as the EoDF (e.g., the EoDF EoDF(TGT)), the memory device 100 (e.g., the memory controller 110, and more particularly, the microprocessor 112 running the fragmentation management ISP code 110FM) can send a Response UPIU of the Read (10) UPIU command to the host device 50 through the transmission interface circuit 118, to notify the host device 50 of the completion of performing the fragmentation information detection (e.g., the fragmentation information such as the EoDF has been detected at the device side), where the memory device 100 (e.g., the memory controller 110) can prepare the Response UPIU of the Read (10) UPIU command in a TX buffer (not shown) of the memory device 100. For example, the Response UPIU of the Read (10) UPIU command may conform to a first predetermined response format.

In Step S20A, after being notified of the completion of performing the fragmentation information detection through the operation of Step S11, the host device 50 (e.g., the processor 52 running the program code 52C) can prepare a Query Request UPIU to be sent to the memory device 100 (e.g., the memory controller 110), for obtaining the fragmentation information such as the EoDF (e.g., the EoDF EoDF(TGT)) from the memory device 100 (e.g., the memory controller 110), where the host device 50 can prepare the Query Request UPIU in the TX buffer of the host device 50.

In Step S21A, the host device 50 (e.g., the processor 52 running the program code 52C) can send the Query Request UPIU to the memory device 100 (e.g., the memory controller 110) through the transmission interface circuit 58, in order to obtain the fragmentation information such as the EoDF (e.g., the EoDF EoDF(TGT)) from the memory device 100 (e.g., the memory controller 110).

In Step S20B, in response to the Query Request UPIU, the memory device 100 (e.g., the memory controller 110, and more particularly, the microprocessor 112 running the fragmentation management ISP code 110FM) can prepare a Query Response UPIU carrying the EoDF (e.g., the EoDF EoDF(TGT)), for being sent to the host device 50, where the memory device 100 (e.g., the memory controller 110) can prepare the Query Response UPIU carrying the EoDF in the TX buffer of the memory device 100.

In Step S21B, the memory device 100 (e.g., the memory controller 110, and more particularly, the microprocessor 112 running the fragmentation management ISP code 110FM) can send the Query Response UPIU to the host device 50 through the transmission interface circuit 118, to notify the host device 50 of the fragmentation information such as the EoDF (e.g., the EoDF EoDF(TGT)), where the Query Response UPIU may carry the fragmentation information such as the EoDF at a predetermined location of the Query Response UPIU.

TABLE 2A

QUERY REQUEST UPIU

| 0 | 1 | 2 | 3 |
|---|---|---|---|
| xx01 0110b | Flags | Reserved | Task Tag |
| 4 | 5 | 6 | 7 |
| Reserved | Query Function | Reserved | Reserved |
| 8 | 9 | 10 (MSB) | 11 (LSB) |
| Total EHS Length (00 h) | Reserved | Data Segment Length | |
| 12 | 13 | 14 | 15 |
| Transaction Specific Fields | | | |
| 16 | 17 | 18 | 19 |
| Transaction Specific Fields | | | |
| 20 | 21 | 22 | 23 |
| Transaction Specific Fields | | | |
| 24 | 25 | 26 | 27 |
| Transaction Specific Fields | | | |
| 28 | 29 | 30 | 31 |
| Reserved | | | |

TABLE 2B

QUERY RESPONSE UPIU

| 0 | 1 | 2 | 3 |
|---|---|---|---|
| xx11 0110b | Flags | Reserved | Task Tag |
| 4 | 5 | 6 | 7 |
| Reserved | Query Function | Query Response | Reserved |
| 8 | 9 | 10 (MSB) | 11 (LSB) |
| Total EHS Length (00 h) | Device Information | Data Segment Length | |
| 12 | 13 | 14 | 15 |
| Transaction Specific Fields | | | |
| 16 | 17 | 18 | 19 |
| Transaction Specific Fields | | | |
| 20 | 21 | 22 | 23 |
| Transaction Specific Fields | | | |
| 24 | 25 | 26 | 27 |
| Transaction Specific Fields | | | |
| 28 | 29 | 30 | 31 |
| Reserved | | | |

Table 2A illustrates an example of the format of the Query Request UPIU, and Table 2B illustrates an example of the format of the Query Response UPIU. The first field labeled "xx01 0110b" in the Query Request UPIU and the first field labeled "xxii 0110b" may represent predetermined values, respectively, where the field names of the other fields shown in Tables 2A and 2B may indicate the meanings of these fields, respectively. For example, the Transaction Specific Fields in Bytes 12-27 in the format of the Query Request UPIU as shown in Table 2A may vary with respect to the Query operation code (opcode). For a read descriptor opcode, an example of the format of the Transaction Specific Fields may be illustrated with Table 3 below:

TABLE 3

Transaction Specific Fields for READ DESCRIPTOR OPCODE

| 12 | 13 | 14 | 15 |
|---|---|---|---|
| 01h | DESCRIPTOR IDN | INDEX | SELECTOR |

TABLE 3-continued

Transaction Specific Fields for READ DESCRIPTOR OPCODE

| 16 | 17 | 18 (MSB) | 19 (LSB) |
|---|---|---|---|
| Reserved | Reserved | LENGTH | |
| 20 | 21 | 22 | 23 |
| | | Reserved | |
| 24 | 25 | 26 | 27 |
| | | Reserved | |

The field "DESCRIPTOR IDN" in the format shown in Table 3 may carry a descriptor identifier (ID) indicating a certain type of descriptor. The host device 50 may set the descriptor ID carried by the field "DESCRIPTOR IDN" in Byte 13 of the Query Request (e.g., the Query Request UPIU) as a target descriptor ID corresponding to a target type of descriptor among of multiple predetermined descriptor IDs respectively corresponding to multiple types of descriptors (e.g., a Device Descriptor, a Configuration Descriptor, a Unit Descriptor, a Geometry Descriptor, and the Device Health Descriptor), to indicate that the corresponding Query Response (e.g., the corresponding Query Response UPIU) should carry the target type of descriptor, for example, starting from Byte 32 of the Query Response (e.g., the Query Response UPIU). In addition, the host device 50 may set the parameter carried by the field "LENGTH" in Bytes 18-19 of the Query Request (e.g., the Query Request UPIU) as the size of the target type of descriptor, where the target type of descriptor carried by the corresponding Query Response (e.g., the corresponding Query Response UPIU) should have this size. For example, the host device 50 may set the descriptor ID carried by the field "DESCRIPTOR IDN" to be 09 h (i.e. 0x09) to indicate that the descriptor carried by the corresponding Query Response UPIU sent from the memory device 100 should be the Device Health Descriptor. As a result, regarding the read descriptor opcode, Bytes 12~15 of the Query Request (e.g., the Query Request UPIU) may be arranged to carry 01 h, 09 h, 00 h and 00 h.

Regarding the aforementioned predetermined location of the Query Response UPIU for carrying the fragmentation information such as the EoDF (e.g., the EoDF EoDF(TGT)), the memory device 100 (e.g., the memory controller 110) can prepare the Query Response UPIU carrying the EoDF at the Device Health Descriptor Offset 05 h as shown in Table 4.

TABLE 4

| Offset | Size | Name | Value | Description |
|---|---|---|---|---|
| 05h | 1 | bDeviceLifeTimeEstC | Device specific | This field provides an indication of the device life time based on the amount of performed program/erase cycles. The calculation method is vendor specific and referred as method B.<br>00h: Information not available<br>01h: 0%-10% device life time used<br>02h: 10%-20% device life time used<br>03h: 20%-30% device life time used<br>04h: 30%-40% device life time used<br>05h: 40%-50% device life time used<br>06h: 50%-60% device life time used<br>07h: 60%-70% device life time used<br>08h: 70%-80% device life time used<br>09h: 80%-90% device life time used<br>0Ah: 90%-100% device life time used<br>0Bh: Exceeded its maximum estimated device life time<br>Others: Reserved |

Table 4 illustrates an example of a Device Life Time Estimation parameter bDeviceLifeTimeEstC for carrying the fragmentation information such as the EoDF (e.g., the EoDF EoDF(TGT)), where the Device Health Descriptor in the Query Response UPIU may comprise the Device Life Time Estimation parameter bDeviceLifeTimeEstC, and may further comprise one or more other Device Life Time Estimation parameters such as the Device Life Time Estimation parameters bDeviceLifeTimeEstA and bDeviceLifeTimeEstB, but the present invention is not limited thereto. In addition, the accuracy of using the Device Life Time Estimation parameter bDeviceLifeTimeEstC to indicate the EoDF (e.g., the EoDF EoDF(TGT)) may depend on the size of the Device Life Time Estimation parameter bDeviceLifeTimeEstC in the Device Health Descriptor. For example, the size of the Device Life Time Estimation parameter bDeviceLifeTimeEstC may be equal to one byte (labeled "1" in the field "Size" of Table 4 for brevity), but the present invention is not limited thereto. Additionally, the associated descriptions for the Device Life Time Estimation parameter bDeviceLifeTimeEstC as shown in Table 4 may be obtained and/or modified from the associated descriptions for one or more previous Device Life Time Estimation parameters (e.g., one or more parameters among the Device Life Time Estimation parameters bDeviceLifeTimeEstA and bDeviceLifeTimeEstB), and the Device Life Time Estimation parameter bDeviceLifeTimeEstC may be arranged to indicate the device life time regarding only partial storage space of the whole storage space (e.g., the partial storage space corresponding to the LBAs {LBA(0), ..., LBA(M)} among the whole storage space corresponding to all LBAs, or the partial storage space corresponding to the PBAs {PBA(0), ..., PBA(M)} among the whole storage space corresponding to all PBAs) with the fragmentation information such as the EoDF (e.g., the EoDF EoDF(TGT)), where the fragmentation information such as the EoDF (e.g., the EoDF EoDF(TGT)) may be positively correlated with the amount of performed program cycles in the partial storage space, but the present invention is not limited thereto. According to some embodiments, the associated descriptions for the Device Life Time Estimation parameter bDeviceLifeTimeEstC as shown in Table 4 may vary. For example, the uppermost portion of the associated descriptions for the Device Life Time Estimation parameter bDeviceLifeTimeEstC may be described as follows:

This field provides an indication of the device life time regarding partial storage space based on the fragmentation information correlated with the amount of performed program cycles. The calculation method is vendor specific and referred to as method C.

In Step S25A, the host device 50 (e.g., the processor 52 running the program code 52C) can compare the fragmentation information such as the EoDF (e.g., the EoDF EoDF (TGT)) with a predetermined threshold such as an EoDF threshold Th_EoDF to determine whether to perform Revise Data Fragmentation (RDF), and more particularly, check whether the EoDF reaches (e.g., is greater than or equal to) the EoDF threshold Th_EoDF to determine whether to perform the RDF, wherein if the EoDF reaches the EoDF threshold Th_EoDF (e.g., EoDF(TGT)≥Th_EoDF), the host device 50 can determine to perform the RDF, otherwise, the host device 50 can determine to prevent performing the RD, but the present invention is not limited thereto. According to some embodiments, the host device 50 can determine to perform the RDF when the EoDF reaches the EoDF threshold Th_EoDF (e.g., EoDF(TGT)>Th_EoDF), and can determine to prevent performing the RDF when the EoDF does not reach the EoDF threshold Th_EoDF (e.g., EoDF (TGT)<Th_EoDF).

In Step S30A, the host device 50 (e.g., the processor 52 running the program code 52C) can set a Revise Data Fragmentation Degree (RDFD) bit as a second predetermined logic value such as one (labeled "RDFD bit=1" for brevity) in a Write (10) UPIU command (e.g., the Write (10) UPIU command carrying associated information with 10 bytes) to be sent to the memory device 100, for asking for performing the RDF, where the host device 50 can prepare the Write (10) UPIU command carrying the RDFD bit in the TX buffer of the host device 50.

In Step S31A, the host device 50 (e.g., the processor 52 running the program code 52C) can send the Write (10) UPIU command carrying the RDFD bit to the memory device 100 (e.g., the memory controller 110) through the transmission interface circuit 58, to ask for performing the RDF, for example, with an RDFD procedure at the device side. For example, the Write (10) UPIU command may conform to a second predetermined command format. According to this embodiment, the Write (10) UPIU command can be taken as an example of the command for carrying the RDFD bit, but the present invention is not limited thereto. According to some embodiments, the command used in the operations of Steps S30A and S31A, such as the command for carrying the RDFD bit, may vary. For example, the command format of this command and/or the number of bytes for carrying the associated information of this command may vary.

The host device 50 can control the memory device 100 (e.g., the memory controller 110) by using the Write (10) UPIU command carrying the RDFD bit, to perform the RDF, and more particularly, to perform data reorganization garbage collection (GC) in the RDFD procedure. In addition, the host device 50 can transmit the starting position such as the aforementioned LBA (e.g., the starting LBA of the target file FILE(TGT)) and the aforementioned transfer length (e.g., the size of the target file FILE(TGT)) as well as the RDFD bit through the Write (10) UPIU command, and use the RDFD bit to inform the memory device 100 (e.g., the memory controller 110) that the host device 50 needs to perform the RDF, and more particularly, needs to perform the data reorganization GC in the RDFD procedure, for example, as shown in Table 5.

TABLE 5

| Byte | Bit 7 | 6 | 5 | 4 | 3 | 2 | 1 | 0 |
|---|---|---|---|---|---|---|---|---|
| 0 | OPERATION CODE (2Ah) | | | | | | | |
| 1 | WRPROTECT = 000b | | | DPO | FUA | Reserved | FUA_NV = 0b | Obsolete |
| 2 | (MSB) LOGICAL BLOCK ADDRESS | | | | | | | |
| 3 | | | | | | | | |
| 4 | | | | | | | | |
| 5 | | | | | | | | (LSB) |
| 6 | Reserved | | RDFD | GROUP NUMBER | | | | |
| 7 | (MSB) TRANSFER LENGTH | | | | | | | |
| 8 | | | | | | | | (LSB) |
| 9 | CONTROL = 00h | | | | | | | |

Table 5 illustrates an example of the second predetermined command format of the Write (10) UPIU command mentioned in Steps S30A and S31A, where there may be multiple fields in Bytes 0-9 in the second predetermined command format, and any of Bytes 0-9 may comprise Bits 7-0. Some fields of the second predetermined command format may be described as follows:

(1) the field "OPERATION CODE" in Byte 0 may carry an operation code such as 2 Ah (e.g., the symbol "h" indicates that the value is a hexadecimal value);

(2) the field "WRPROTECT" in Bits 7-5 of Byte 1 may carry a predetermined binary code such as 000b (e.g., the symbol "b" indicates that the value is a binary value);

(3) the field "DPO" in Bit 4 of Byte 1 may carry a DPO parameter;

(4) the field "FUA" in Bit 3 of Byte 1 may carry a FUA parameter;

(5) the field "FUA_NV" in Bit 1 of Byte 1 may carry another predetermined binary code such as Ob;

(6) the field "LOGICAL BLOCK ADDRESS" in Bytes 2-5, from the MSB of Byte 2 to the LSB of Byte 5, may carry a LBA;

(7) the field "RDFD" in Bit 5 of Byte 6 may carry the RDFD bit;
(8) the field "GROUP NUMBER" in Bits 4-0 of Byte 6 may carry a group number;
(9) the field "TRANSFER LENGTH" in Bytes 7-8, from the MSB of Byte 7 to the LSB of Byte 8, may carry a transfer length; and
(10) the field "CONTROL" in Byte 9 may carry a control code such as 00 h;

where some other fields may be reserved (labeled "Reversed") and therefore may be regarded as reserved fields, but the present invention is not limited thereto. In addition, the RDFD bit in the field "RDFD" of the second predetermined command format can be regarded as an RDFD flag.

As shown in Table 5, the RDFD bit can be carried with the field "RDFD" in Bit 5 of Byte 6, but the present invention is not limited thereto. According to some embodiments, the second predetermined command format and the location for carrying the RDFD bit in the second predetermined command format may vary. For example, the field "RDFD" may be moved to another location in the second predetermined command format, such as any bit among Bit 6 of Byte 6, Bit 7 of Byte 6, etc.

In Step S30B, in response to the Write (10) UPIU command, the memory device 100 (e.g., the memory controller 110, and more particularly, the microprocessor 112 running the fragmentation management ISP code 110FM) can perform the RDF, and more particularly, perform data reorganization GC in the RDFD procedure.

In Step S31B, after performing the data reorganization GC, the memory device 100 (e.g., the memory controller 110, and more particularly, the microprocessor 112 running the fragmentation management ISP code 110FM) can send a Response UPIU of the Write (10) UPIU command to the host device 50 through the transmission interface circuit 118, to notify the host device 50 of the completion of performing the RDF such as the data reorganization GC, where the memory device 100 (e.g., the memory controller 110) can prepare the Response UPIU of the Write (10) UPIU command in the TX buffer of the memory device 100. For example, the Response UPIU of the Write (10) UPIU command may conform to a second predetermined response format.

In Step S35A, after receiving the Response UPIU of the Write (10) UPIU command, the host device 50 (e.g., the processor 52 running the program code 52C) can determine that the RDF such as the data reorganization GC is finished.

According to some embodiments, the TX buffer of the host device 50 may be positioned within the transmission interface circuit 58, and the TX buffer of the memory device 100 may be positioned within the transmission interface circuit 118, but the present invention is not limited thereto. According to some embodiments, the location for implementing the TX buffer of the host device 50 and/or the location for implementing the TX buffer of the memory device 100 may vary. For example, the TX buffer of the host device 50 may be positioned within another circuit/component (e.g., a RAM) within the host device 50 and/or the TX buffer of the memory device 100 may be positioned within another circuit/component (e.g., the RAM 116) within the memory device 100.

According to some embodiments, the Response UPIU of the Read (10) UPIU command as mentioned in Step S11B and the Response UPIU of the Write (10) UPIU command as mentioned in Step S31B may conform to a same predetermined response format, where the first predetermined response format and the second predetermined response format may be implemented by way of the same predetermined response format.

TABLE 6

Basic UPIU Header Format

| Transaction Type | Flags | LUN | Task Tag |
|---|---|---|---|
| Initiator ID    Command Set Type | Query Function, Task Manag. Function | Response | Status |
| Total EHS Length | Device Information | Data Segment Length | |

TABLE 7

RESPONSE UPIU

| 0 | 1 | 2 | 3 |
|---|---|---|---|
| xx10 0001b | Flags | LUN | Task Tag |
| 4 | 5 | 6 | 7 |
| IID    Command Set Type | Reserved | Response | Status |

Table 6 and Table 7 illustrate examples of a basic UPIU header format of a UPIU and an associated format of a Response UPIU, respectively. The first field "Transaction Type" in the basic UPIU header format shown in Table 6 may be set as "xx10 0001b" for the Response UPIU as shown in Table 7, and the fields "Flags", "LUN" and "Task Tag" in any format among the basic UPIU header format shown in Table 6 and the associated format shown in Table 7 may carry one or more flags, a logical unit number (LUN) and a task tag, respectively. In addition, the fields "Initiator ID", "Command Set Type", "Response" and "Status" in the basic UPIU header format shown in Table 6 may be implemented as the fields "IID", "Command Set Type", "Response" and "Status" for the Response UPIU as shown in Table 7, for carrying an initiator ID, a command set type, a response opcode and status information, respectively, where the field "Query Function, Task Manag. Function" regarding a query function or a task management function in the basic UPIU header format shown in Table 6 may be implemented as a reserved field (labeled "Reserved" for brevity) for the Response UPIU as shown in Table 7, but the present invention is not limited thereto.

TABLE 8

| Opcode | Response Description |
|---|---|
| 00h | Target Success |
| 01h | Target Failure |
| 02h-7Fh | Reserved |
| 80h | DFD/RDFD Success |
| 81h | DFD/RDFD Failure |
| 82h-FFh | Vendor Specific |

Table 8 illustrates a plurality of candidate values of the response opcode carried by the field "Response" in Byte 6 of the Response UPIU (e.g., the Response UPIU of the Read (10) UPIU command as mentioned in Step S11B and the Response UPIU of the Write (10) UPIU command as mentioned in Step S31B) according to an embodiment of the present invention. For better comprehension, if a response is required from a target device (e.g., the memory device 100), the field "Response" in Byte 6 of the Response UPIU may indicate whether the requested function succeeded or failed, where this field may be reserved in UPIU transactions from an initiator device (e.g., the host device 50) to the target device (e.g., the memory device 100), but the present invention is not limited thereto. For example, the plurality of candidate values of the response opcode may comprise:
(1) 00 h, arranged to indicate Target Success;
(2) 01 h, arranged to indicate Target Failure;
(3) 02 h-7 Fh that are reserved;
(4) 80 h, arranged to indicate DFD/RDFD Success;
(5) 81 h, arranged to indicate DFD/RDFD Failure; and
(6) 82 h-FFh that are vendor specific;
but the present invention is not limited thereto. According to some embodiments, the candidate value 80h for indicating DFD/RDFD Success and/or the candidate value 81h for indicating DFD/RDFD Failure may vary.

According to some embodiments, the host device 50 can determine whether the requested function (e.g., the function of preparing the fragmentation information such as the EoDF) of the Read (10) UPIU command as mentioned in Step S11A succeeded or failed according to the response opcode (e.g., the candidate value 80h for indicating DFD/RDFD Success or the candidate value 81h for indicating DFD/RDFD Failure as defined in Table 8) in the Response UPIU of the Read (10) UPIU command. For example, when successfully preparing the fragmentation information such as the EoDF, the memory device 100 (e.g., the memory controller 110) may set the response opcode in the Response UPIU of the Read (10) UPIU command to be the candidate value 80h for indicating DFD Success, to notify the host device 50 of this situation. For another example, when failing to prepare the fragmentation information such as the EoDF, the memory device 100 (e.g., the memory controller 110) may set the response opcode in the Response UPIU of the Read (10) UPIU command to be the candidate value 81h for indicating DFD Failure, to notify the host device 50 of this situation. In addition, the host device 50 can determine whether the requested function (e.g., the function of performing the RDF) of the Write (10) UPIU command as mentioned in Step S31A succeeded or failed according to the response opcode (e.g., the candidate value 80h for indicating DFD/RDFD Success or the candidate value 81h for indicating DFD/RDFD Failure as defined in Table 8) in the Response UPIU of the Write (10) UPIU command. For example, when successfully performing the RDF, the memory device 100 (e.g., the memory controller 110) may set the response opcode in the Response UPIU of the Write (10) UPIU command to be the candidate value 80h for indicating RDFD Success, to notify the host device 50 of this situation. For another example, when failing to perform the RDF, the memory device 100 (e.g., the memory controller 110) may set the response opcode in the Response UPIU of the Write (10) UPIU command to be the candidate value 81h for indicating RDFD Failure, to notify the host device 50 of this situation. For brevity, similar descriptions for these embodiments are not repeated in detail here.

Figure 3:
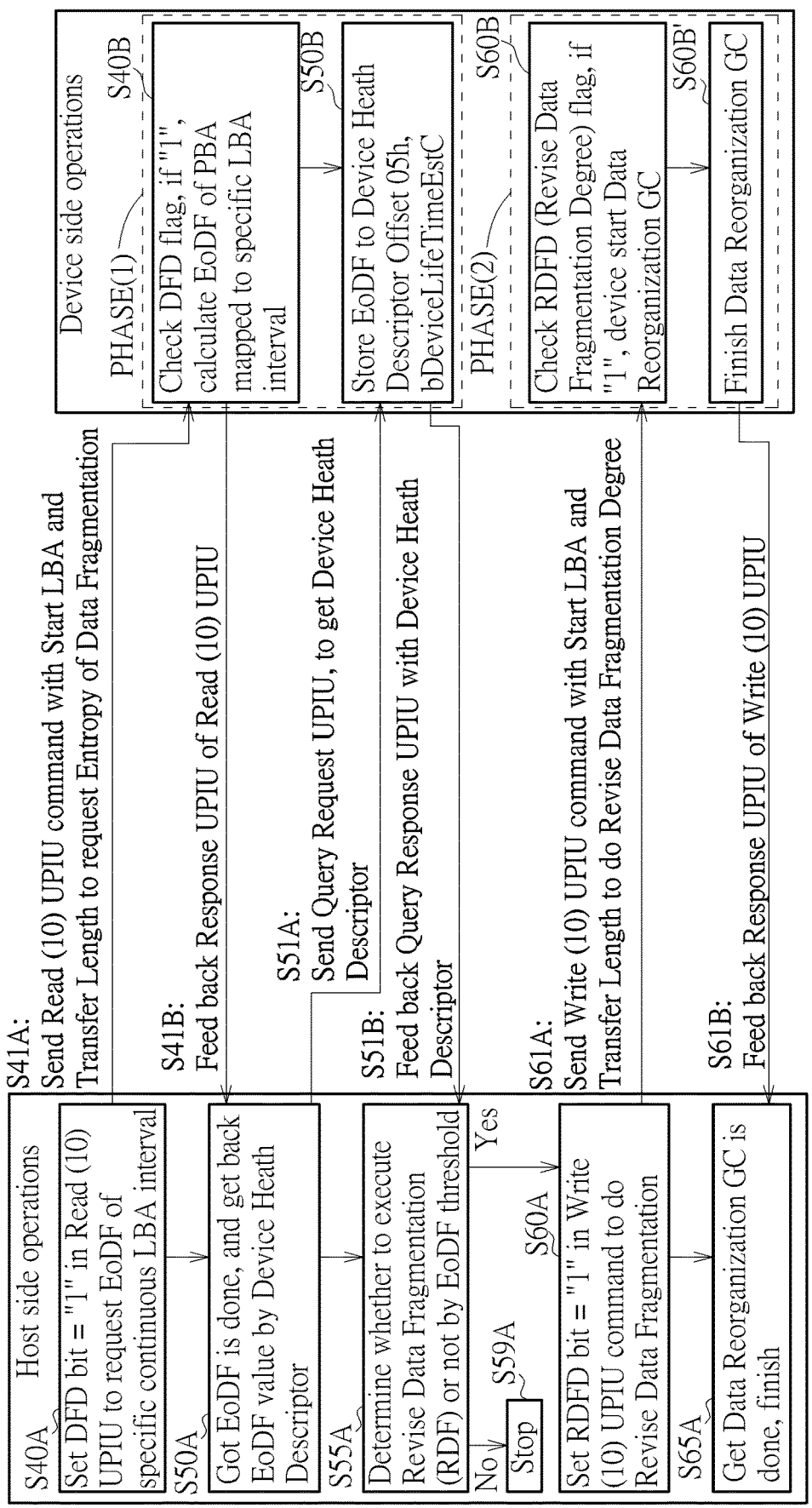
FIG. 3 illustrates some implementation details of the fragmentation management control scheme shown in FIG. 2 according to an embodiment of the present invention.

FIG. 3 illustrates some implementation details of the fragmentation management control scheme shown in FIG. 2 according to an embodiment of the present invention. For better comprehension, the host side operations such as the operations of Steps S40A, S41A, S50A, S51A, S55A, S60A, S61A and S65A shown in FIG. 3 can be taken as examples of the operations of Steps S10A, S11A, S20A, S21A, S25A, S30A, S31A and S35A at the host side as shown in FIG. 2, respectively, and the device side operations such as the operations of Steps S40B, S41B, S50B, S51B, {S60B, S60B'} and S61B shown in FIG. 3 can be taken as examples of the operations of Steps S10B, S11B, S20B, S21B, S30B and S31B at the device side as shown in FIG. 2, respectively, but the present invention is not limited thereto.

In Step S40A, the host device 50 (e.g., the processor 52 running the program code 52C) can set the DFD bit as the first predetermined logic value such as the logic value "1" in the Read (10) UPIU command (labeled "Read (10) UPIU" for brevity) to request the EoDF of a specific continuous LBA interval, such as the EoDF EoDF(TGT) of the target file FILE(TGT).

In Step S41A, the host device 50 (e.g., the processor 52 running the program code 52C) can send the Read (10) UPIU command with the start LBA and the transfer length, as well as the DFD bit, to the memory device 100 (e.g., the memory controller 110) through the transmission interface circuit 58, to request the EoDF of the specific continuous LBA interval (e.g., the EoDF EoDF(TGT) of the target file FILE(TGT)).

In Step S40B, in response to the Read (10) UPIU command carrying the DFD bit (e.g., DFD bit=1), the memory device 100 (e.g., the memory controller 110) can calculate the EoDF of PBA(s) mapped to the specific continuous LBA interval, such as the EoDF EoDF(TGT) of the PBAs {PBA(0), ..., PBA(M)}.

In Step S41B, after generating the fragmentation information such as the EoDF (e.g., the EoDF EoDF(TGT)), the memory device 100 (e.g., the memory controller 110) can feed back the Response UPIU of the Read (10) UPIU command to the host device 50 through the transmission interface circuit 118.

In Step S50A, after having got that the operation of generating the EoDF is done at the device side, the host device 50 (e.g., the processor 52 running the program code 52C) can prepare Query Request UPIU with the Device Heath Descriptor for getting back the EoDF value (e.g., the EoDF EoDF(TGT)) from the memory device 100 (labeled "get back EoDF value by Device Heath Descriptor" for brevity).

In Step S51A, the host device 50 (e.g., the processor 52 running the program code 52C) can send the Query Request UPIU to the memory device 100 (e.g., the memory controller 110) through the transmission interface circuit 58, in order to get the EoDF (e.g., the EoDF EoDF(TGT)) carried by the Device Heath Descriptor from the memory device 100 (e.g., the memory controller 110).

In Step S50B, in response to the Query Request UPIU, the memory device 100 (e.g., the memory controller 110) can store the EoDF (e.g., the EoDF EoDF(TGT)) to the Device Heath Descriptor Offset 05 h, to be the Device Life Time Estimation parameter bDeviceLifeTimeEstC in the Device Heath Descriptor of the Query Response UPIU prepared in the TX buffer of the memory device 100.

In Step S51B, the memory device 100 (e.g., the memory controller 110) can feed back the Query Response UPIU with the Device Heath Descriptor to the host device 50 through the transmission interface circuit 118.

In Step S55A, the host device 50 (e.g., the processor 52 running the program code 52C) can determine whether to execute the Revise Data Fragmentation (RDF) or not, for example, by the EoDF threshold Th_EoDF, and more particularly, by the comparing operation based on the EoDF threshold Th_EoDF (e.g., the operation of comparing the EoDF EoDF(TGT) with the EoDF threshold Th_EoDF). If the comparison result of the comparing operation is Yes (e.g., EoDF(TGT)≥Th_EoDF), Step S60A is entered; if the comparison result of the comparing operation is No (e.g., EoDF(TGT)<Th_EoDF), Step S59A is entered.

In Step S59A, the host device 50 (e.g., the processor 52 running the program code 52C) can stop further processing, where the host device 50 and the memory device 100 may transit to the idle states thereof afterward, respectively.

In Step S60A, the host device 50 (e.g., the processor 52 running the program code 52C) can set the RDFD bit as the second predetermined logic value such as the logic value "1" in the Write (10) UPIU command to do the RDF.

In Step S61A, the host device 50 (e.g., the processor 52 running the program code 52C) can send the Write (10) UPIU command with the start LBA and the transfer length, as well as the RDFD bit, to the memory device 100 (e.g., the memory controller 110) through the transmission interface circuit 58, to do the RDF with the RDFD procedure at the device side.

In Step S60B, in response to the Write (10) UPIU command carrying the RDFD bit (e.g., RDFD bit=1), the memory device 100 (e.g., the memory controller 110) can check the RDFD flag expressed with the RDFD bit, and more particularly, check whether the RDFD bit is equal to the second predetermined logic value such as the logic value "1", for example, if the RDFD bit is equal to the second predetermined logic value such as the logic value "1", the memory device 100 (e.g., the memory controller 110) can start the data reorganization GC in the RDFD procedure.

In Step S60B', the memory device 100 (e.g., the memory controller 110) can finish the data reorganization GC in the RDFD procedure.

In Step S61B, after performing the data reorganization GC, the memory device 100 (e.g., the memory controller 110) can feed back the Response UPIU of the Write (10) UPIU command to the host device 50 through the transmission interface circuit 118, to notify the host device 50 of the completion of performing the RDF such as the data reorganization GC.

In Step S65A, after receiving the Response UPIU of the Write (10) UPIU command, the host device 50 (e.g., the processor 52 running the program code 52C) can get that the RDF such as the data reorganization GC is done, and therefore can finish the procedure of the host side operations mentioned above.

As shown in the right half of FIG. 3, the memory device 100 (e.g., the memory controller 110) can perform the operations of Steps S40B, S50B, etc. in a device side processing phase PHASE(1) and perform the operations of Steps S60B, S60B', etc. in a device side processing phase PHASE(2), where the memory device 100 (e.g., the memory controller 110) can finish the procedure of the host side operations mentioned above afterward. For brevity, similar descriptions for this embodiment are not repeated in detail here.

According to some embodiments, a number (e.g., ten, or 10) specified in the name of a command (e.g., the Read (10) UPIU command or the Write (10) UPIU command) may indicate the byte counts of the associated parameters carried by this command. For example, in a situation where the number specified in the name of the command (e.g., the Read (10) UPIU command or the Write (10) UPIU command) is equal to ten (e.g., 10), this command may carry ten bytes of parameters. For brevity, similar descriptions for these embodiments are not repeated in detail here.

Figure 4:
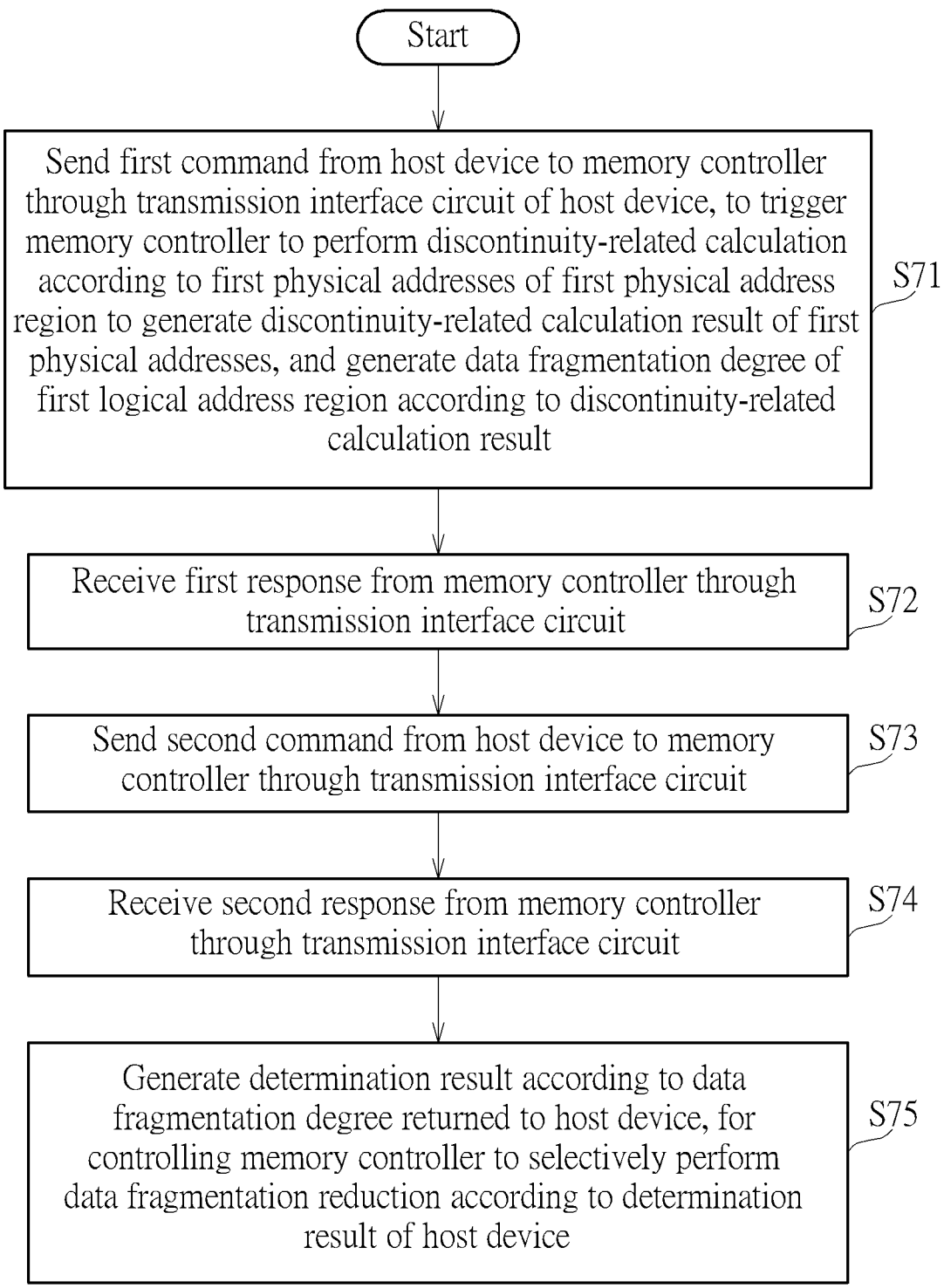
FIG. 4 illustrates a host-side working flow of the method according to an embodiment of the present invention.

FIG. 4 illustrates a host-side working flow of the method according to an embodiment of the present invention, where the program code 52C stored in the computer-readable medium 52M may cause the host device 50 (e.g., the processor 52) to operate according to the method when executed by the host device 50 (e.g., the processor 52).

In Step S71, the host device 50 can send a first command (e.g., the Read (10) UPIU command) from the host device 50 to the memory controller 110 through the transmission interface circuit 58 of the host device 50, to trigger the memory controller 110 to perform discontinuity-related calculation according to a plurality of first physical addresses (e.g., the PBAs {PBA(0), ..., PBA(M)}) of at least one first physical address region (e.g., one or more physical address regions comprising the PBAs {PBA(0), ..., PBA(M)}) to generate a discontinuity-related calculation result (e.g., the EoDF mentioned above, such as the EoDF EoDF(TGT)) of the plurality of first physical addresses (e.g., the PBAs {PBA(0), ..., PBA(M)}), and generate a data fragmentation degree of at least one first logical address region (e.g., one or more logical address regions comprising the LBAs {LBA(0), ..., LBA(M)}) according to the discontinuity-related calculation result (e.g., the EoDF). For example, the first command (e.g., the Read (10) UPIU command) may carry at least one first logical address (e.g., the LBA LBA(0)) for indicating the aforementioned at least one first logical address region (e.g., the one or more logical address regions comprising the LBAs {LBA(0), ..., LBA(M)}), and may further carry a first indication (e.g., the DFD bit) for indicating that generating the data fragmentation degree of the aforementioned at least one first logical address region (e.g., the one or more logical address regions comprising the LBAs {LBA(0), ..., LBA(M)}) is requested, where the aforementioned at least one first physical address region (e.g., the one or more physical address regions comprising the PBAs {PBA(0), ..., PBA(M)}) may be associated with the aforementioned at least one first logical address region (e.g., the one or more logical address regions comprising the LBAs {LBA(0), ..., LBA(M)}), and the discontinuity-related calculation result (e.g., the EoDF) may indicate a degree of discontinuity of the plurality of first physical addresses (e.g., the PBAs {PBA(0), ..., PBA(M)}).

The memory controller 110 can be arranged to determine the aforementioned at least one first physical address region (e.g., the one or more physical address regions comprising the PBAs {PBA(0), ..., PBA(M)}) of the NV memory 120 according to the aforementioned at least one first logical address region (e.g., the one or more logical address regions comprising the LBAs {LBA(0), ..., LBA(M)}), for example, by performing address mapping based on the global L2P address mapping table 120T. In addition, the first command (e.g., the Read (10) UPIU command) may conform to the first predetermined command format such as that shown in Table 1, and the first indication (e.g., the DFD bit) may represent a bit in a first predetermined field (e.g., the field "DFD" shown in Table 1) of the first predetermined command format. Additionally, the first predetermined command format may comprise an operation code field such as the field "OPERATION CODE" for carrying the operation code, a logical block address field such as the field "LOGICAL BLOCK ADDRESS" for carrying the LBA, the first predetermined field such as the field "DFD" for carrying the first indication such as the DFD bit, and a transfer length field such as the field "TRANSFER LENGTH" for carrying the transfer length, where a combination of the LBA and the transfer length may indicate the aforementioned at least one first logical address region (e.g., the one or more logical address regions comprising the LBAs {LBA(0), ..., LBA(M)}).

In Step S72, after generating the data fragmentation degree is completed, the host device 50 can receive a first response (e.g., the Response UPIU of the Read (10) UPIU command) from the memory controller 110 through the transmission interface circuit 58, where the first response (e.g., the Response UPIU of the Read (10) UPIU command)

is sent by the memory controller 110 to the host device 50 in response to the first command (e.g., the Read (10) UPIU command).

In Step S73, the host device 50 can send a second command (e.g., the Query Request UPIU) from the host device 50 to the memory controller 110 through the transmission interface circuit 58, where the second command (e.g., the Query Request UPIU) is arranged to indicate that returning the data fragmentation degree to the host device 50 is requested.

In Step S74, the host device 50 can receive a second response (e.g., the Query Response UPIU) from the memory controller 110 through the transmission interface circuit 58, where the second response (e.g., the Query Response UPIU) is sent by the memory controller 110 to the host device 50 in response to the second command (e.g., the Query Request UPIU) to return the data fragmentation degree to the host device 50, and the second response (e.g., the Query Response UPIU) carries the data fragmentation degree.

The second response (e.g., the Query Response UPIU) may carry a second indication (e.g., the Device Life Time Estimation parameter bDeviceLifeTimeEstC) for indicating the data fragmentation degree. For example, the second response (e.g., the Query Response UPIU) may conform to a predetermined format, and the predetermined format may comprises at least one field for carrying a predetermined descriptor (e.g., the Device Heath Descriptor), where the second indication (e.g., the Device Life Time Estimation parameter bDeviceLifeTimeEstC) is embedded in the predetermined descriptor (e.g., the Device Heath Descriptor), but the present invention is not limited thereto. In some examples, the second response (e.g., the Query Response UPIU) may comprise the predetermined descriptor such as the Device Heath Descriptor, and the second indication may be a device life time estimation parameter (e.g., the Device Life Time Estimation parameter bDeviceLifeTimeEstC) among multiple device life time estimation parameters (e.g., the Device Life Time Estimation parameters bDeviceLifeTimeEstA, bDeviceLifeTimeEstB and bDeviceLifeTimeEstC) within the predetermined descriptor. More particularly, the predetermined descriptor may represent a device heath descriptor carrying at least three device life time estimation parameters, such as the Device Heath Descriptor carrying the Device Life Time Estimation parameters bDeviceLifeTimeEstA, bDeviceLifeTimeEstB and bDeviceLifeTimeEstC. For example, the second response (e.g., the Query Response UPIU) may carry a first device life time estimation parameter (e.g., the Device Life Time Estimation parameter bDeviceLifeTimeEstA), a second device life time estimation parameter (e.g., the Device Life Time Estimation parameter bDeviceLifeTimeEstB), and a third device life time estimation parameter (e.g., the Device Life Time Estimation parameter bDeviceLifeTimeEstC), where the second indication represents the third device life time estimation parameter.

In Step S75, the host device 50 can generate a determination result (e.g., a certain determination result among multiple determination results of any of Steps S25A and S55A, such as one of the determination results "Yes" and "No" as shown in the left half of FIG. 3) according to the data fragmentation degree returned to the host device 50, for controlling the memory controller 110 to selectively perform data fragmentation reduction according to the determination result of the host device 50. For brevity, similar descriptions for this embodiment are not repeated in detail here.

For better comprehension, the method may be illustrated with the working flow shown in FIG. 4, but the present invention is not limited thereto. According to some embodiments, one or more steps may be added, deleted, or changed in the working flow shown in FIG. 4. For example, the method may further comprise some other steps (e.g., subsequent steps executed after Step S75 in the working flow shown in FIG. 4) as follows:

(1) the host device 50 can send a third command (e.g., the Write (10) UPIU command) from the host device 50 to the memory controller 110 through the transmission interface circuit 58, to trigger the memory controller 110 to perform the data fragmentation reduction on at least one second physical address region, where the third command (e.g., the Write (10) UPIU command) may carry at least one second logical address for indicating at least one second logical address region among the aforementioned at least one first logical address region (e.g., the one or more logical address regions comprising the LBAs {LBA(0), . . . , LBA(M)}), and may further carry a third indication (e.g., the RDFD bit) for indicating that performing the data fragmentation reduction on the aforementioned at least one second logical address region is requested, and the aforementioned at least one second physical address region is associated with the aforementioned at least one second logical address region; and (2) after performing the data fragmentation reduction on the aforementioned at least one second physical address region is completed, the host device 50 can receive a third response (e.g., the Response UPIU of the Write (10) UPIU command) from the memory controller 110 through the transmission interface circuit 58, where the third response is sent by the memory controller 110 to the host device 50 in response to the third command (e.g., the Write (10) UPIU command); where the third command (e.g., the Write (10) UPIU command) may conform to the second predetermined command format such as that shown in Table 5, and the third indication (e.g., the RDFD bit) may represent a bit in a predetermined field (e.g., the field "RDFD") of the second predetermined command format, but the present invention is not limited thereto. For example, the aforementioned at least one second logical address may be equal to the aforementioned at least one first logical address, and the aforementioned at least one second logical address region may be equal to the aforementioned at least one first logical address region (e.g., the one or more logical address regions comprising the LBAs {LBA(0), . . . , LBA(M)}). For brevity, similar descriptions for these embodiments are not repeated in detail here.

Figure 5:
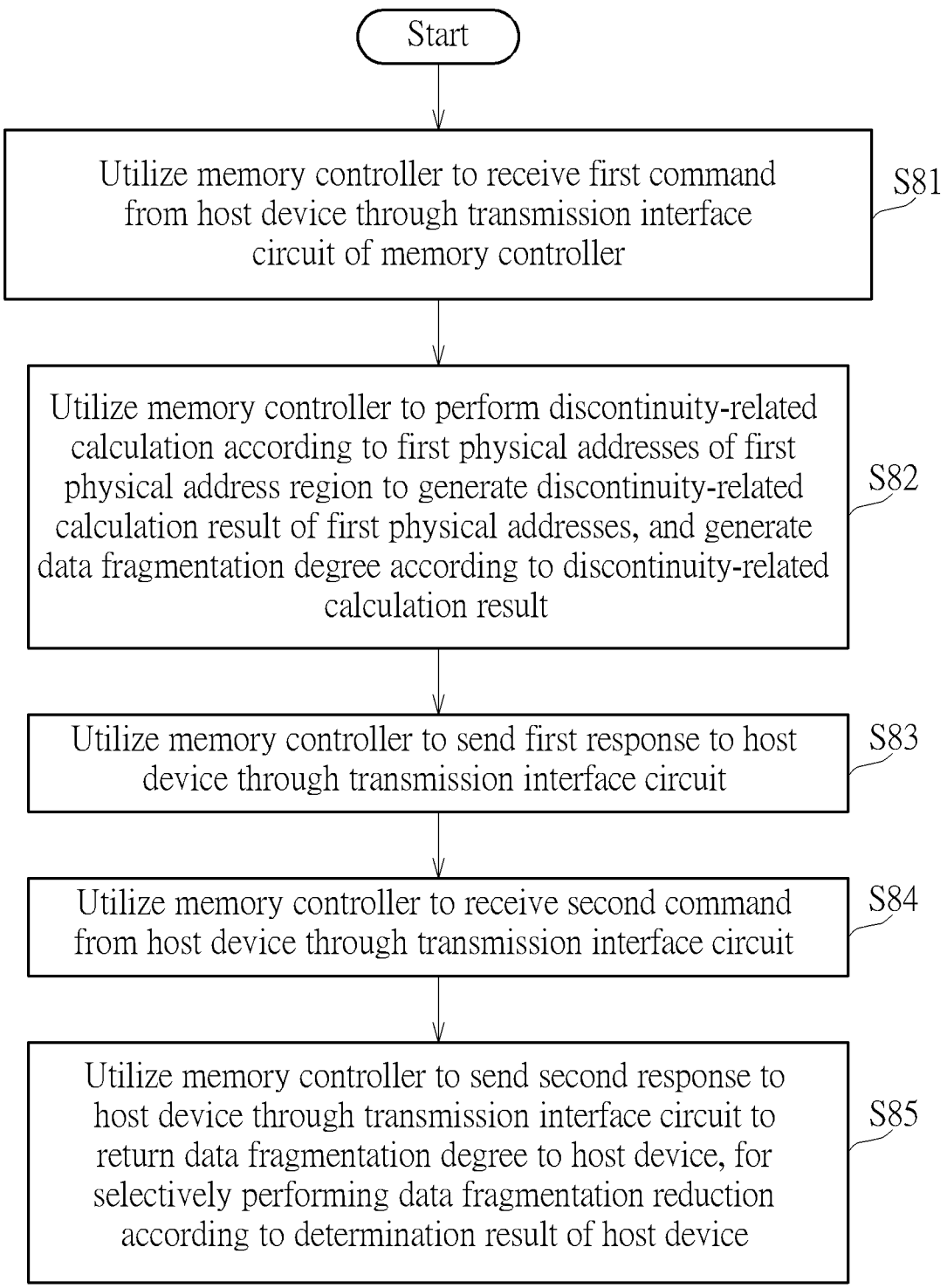
FIG. 5 illustrates a device-side working flow of the method according to an embodiment of the present invention.

FIG. 5 illustrates a device-side working flow of the method according to an embodiment of the present invention.

In Step S81, the electronic device 10 can utilize the memory controller 110 to receive the first command (e.g., the Read (10) UPIU command) from the host device 50 through the transmission interface circuit 118 of the memory controller 110, where the first command (e.g., the Read (10) UPIU command) may carry the aforementioned at least one first logical address (e.g., the LBA LBA(0)) for indicating the aforementioned at least one first logical address region (e.g., the one or more logical address regions comprising the LBAs {LBA(0), . . . , LBA(M)}), and may further carry the first indication (e.g., the DFD bit) for indicating that generating a data fragmentation degree of the aforementioned at least one first logical address region (e.g., the one or more logical address regions comprising the LBAs {LBA(0), ..., LBA(M)}) is requested.

In Step S82, in response to the first command (e.g., the Read (10) UPIU command) from the host device 50, the electronic device 10 can utilize the memory controller 110 to perform the discontinuity-related calculation according to the plurality of first physical addresses (e.g., the PBAs {PBA(0), ..., PBA(M)}) of the aforementioned at least one first physical address region (e.g., the one or more physical address regions comprising the PBAs {PBA(0), ..., PBA(M)}) to generate the discontinuity-related calculation result (e.g., the EoDF mentioned above, such as the EoDF EoDF(TGT)) of the plurality of first physical addresses (e.g., the PBAs {PBA(0), ..., PBA(M)}), and generate the data fragmentation degree according to the discontinuity-related calculation result (e.g., the EoDF), where the aforementioned at least one first physical address region (e.g., the one or more physical address regions comprising the PBAs {PBA(0), ..., PBA(M)}) is associated with the aforementioned at least one first logical address region (e.g., the one or more logical address regions comprising the LBAs {LBA(0), ..., LBA(M)}), and the discontinuity-related calculation result (e.g., the EoDF) indicates the degree of discontinuity of the plurality of first physical addresses (e.g., the PBAs {PBA(0), ..., PBA(M)}).

In Step S83, after generating the data fragmentation degree is completed, the electronic device 10 can utilize the memory controller 110 to send the first response (e.g., the Response UPIU of the Read (10) UPIU command) to the host device 50 through the transmission interface circuit 118, where the first response (e.g., the Response UPIU of the Read (10) UPIU command) is sent to the host device 50 in response to the first command (e.g., the Read (10) UPIU command).

In Step S84, the electronic device 10 can utilize the memory controller 110 to receive the second command (e.g., the Query Request UPIU) from the host device 50 through the transmission interface circuit 118, where the second command (e.g., the Query Request UPIU) is arranged to indicate that returning the data fragmentation degree to the host device 50 is requested.

In Step S85, in response to the second command (e.g., the Query Request UPIU) from the host device 50, the electronic device 10 can utilize the memory controller 110 to send the second response (e.g., the Query Response UPIU) to the host device 50 through the transmission interface circuit 118 to return the data fragmentation degree to the host device 50, for selectively performing the data fragmentation reduction according to the determination result of the host device 50, where the second response (e.g., the Query Response UPIU) carries the data fragmentation degree, and the determination result is generated according to the data fragmentation degree returned to the host device 50. For brevity, similar descriptions for this embodiment are not repeated in detail here.

For better comprehension, the method may be illustrated with the working flow shown in FIG. 5, but the present invention is not limited thereto. According to some embodiments, one or more steps may be added, deleted, or changed in the working flow shown in FIG. 5. For example, the method may further comprise some other steps (e.g., subsequent steps executed after Step S85 in the working flow shown in FIG. 5) as follows:

(1) the electronic device 10 can utilize the memory controller 110 to receive the third command (e.g., the Write (10) UPIU command) from the host device 50 through the transmission interface circuit 118, where the third command (e.g., the Write (10) UPIU command) may carry the aforementioned at least one second logical address for indicating the aforementioned at least one second logical address region among the aforementioned at least one first logical address region (e.g., the one or more logical address regions comprising the LBAs {LBA(0), ..., LBA(M)}), and may further carry the third indication (e.g., the RDFD bit) for indicating that performing the data fragmentation reduction on the aforementioned at least one second logical address region is requested;

(2) in response to the third command (e.g., the Write (10) UPIU command) from the host device 50, the electronic device 10 can utilize the memory controller 110 to perform the data fragmentation reduction on the aforementioned at least one second physical address region, for example, the memory controller 110 can be arranged to determine the aforementioned at least one second physical address region of the NV memory 120 according to the aforementioned at least one second logical address region, where the aforementioned at least one second physical address region is associated with the aforementioned at least one second logical address region; and (3) after performing the data fragmentation reduction on the aforementioned at least one second physical address region is completed, the electronic device 10 can utilize the memory controller 110 to send the third response (e.g., the Response UPIU of the Write (10) UPIU command) to the host device 50 through the transmission interface circuit 118, where the third response is sent to the host device 50 in response to the third command (e.g., the Write (10) UPIU command); but the present invention is not limited thereto. For example, the aforementioned at least one second logical address may be equal to the aforementioned at least one first logical address, and the aforementioned at least one second logical address region may be equal to the aforementioned at least one first logical address region (e.g., the one or more logical address regions comprising the LBAs {LBA(0), ..., LBA(M)}). For brevity, similar descriptions for these embodiments are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data fragmentation reduction control of a memory device in a predetermined communications architecture with aid of fragmentation information detection, the method being applied to a memory controller of the memory device, the memory device comprising the memory controller and a non-volatile (NV) memory, the NV memory comprising at least one NV memory element, the method comprising:

utilizing the memory controller to receive a first command from a host device through a transmission interface circuit of the memory controller, wherein the first command carries at least one first logical address for indicating at least one first logical address region, and further carries a first indication for indicating that generating a data fragmentation degree of the at least one first logical address region is requested;

in response to the first command from the host device, utilizing the memory controller to perform discontinuity-related calculation according to a plurality of first physical addresses of at least one first physical address region to generate a discontinuity-related calculation result of the plurality of first physical addresses, and generate the data fragmentation degree according to the discontinuity-related calculation result, wherein the at least one first physical address region is associated with the at least one first logical address region, and the discontinuity-related calculation result indicates a degree of discontinuity of the plurality of first physical addresses;

after generating the data fragmentation degree is completed, utilizing the memory controller to send a first response to the host device through the transmission interface circuit, wherein the first response is sent to the host device in response to the first command;

utilizing the memory controller to receive a second command from the host device through the transmission interface circuit, wherein the second command is arranged to indicate that returning the data fragmentation degree to the host device is requested; and in response to the second command from the host device, utilizing the memory controller to send a second response to the host device through the transmission interface circuit to return the data fragmentation degree to the host device, for selectively performing data fragmentation reduction according to a determination result of the host device, wherein the second response carries the data fragmentation degree, and the determination result is generated according to the data fragmentation degree returned to the host device.

2. The method of claim 1, wherein the first command conforms to a first predetermined command format, and the first indication represents a bit in a first predetermined field of the first predetermined command format.

3. The method of claim 2, wherein the first predetermined command format comprises an operation code field for carrying an operation code, a logical block address field for carrying a logical block address, the first predetermined field for carrying the first indication, and a transfer length field for carrying a transfer length, where a combination of the logical block address and the transfer length indicates the at least one first logical address region.

4. The method of claim 1, wherein the second response carries a second indication for indicating the data fragmentation degree.

5. The method of claim 4, wherein the second response conforms to a predetermined format, and the predetermined format comprises at least one field for carrying a predetermined descriptor, wherein the second indication is embedded in the predetermined descriptor.

6. The method of claim 4, wherein the second response comprises a predetermined descriptor, and the second indication is a device life time estimation parameter among multiple device life time estimation parameters within the predetermined descriptor.

7. The method of claim 6, wherein the predetermined descriptor represents a device heath descriptor carrying at least three device life time estimation parameters.

8. The method of claim 4, wherein the second response carries a first device life time estimation parameter, a second device life time estimation parameter, and a third device life time estimation parameter, and the second indication represents the third device life time estimation parameter.

9. The method of claim 1, further comprising:

utilizing the memory controller to receive a third command from the host device through the transmission interface circuit, wherein the third command carries at least one second logical address for indicating at least one second logical address region among the at least one first logical address region, and further carries a third indication for indicating that performing the data fragmentation reduction on the at least one second logical address region is requested;

in response to the third command from the host device, utilizing the memory controller to perform the data fragmentation reduction on at least one second physical address region, wherein the at least one second physical address region is associated with the at least one second logical address region; and after performing the data fragmentation reduction on the at least one second physical address region is completed, utilizing the memory controller to send a third response to the host device through the transmission interface circuit, wherein the third response is sent to the host device in response to the third command.

10. The method of claim 9, wherein the third command conforms to a predetermined command format, and the third indication represents a bit in a predetermined field of the predetermined command format.

11. The method of claim 9, wherein the at least one second logical address is equal to the at least one first logical address, and the at least one second logical address region is equal to the at least one first logical address region.

12. A memory controller of a memory device, the memory device comprising the memory controller and a non-volatile (NV) memory, the NV memory comprising at least one NV memory element, the memory controller comprising:

a processing circuit, arranged to control the memory controller according to a plurality of host commands from a host device, to allow the host device to access the NV memory through the memory controller, wherein the processing circuit is arranged to perform data fragmentation reduction control of the memory device in a predetermined communications architecture with aid of fragmentation information detection; and a transmission interface circuit, arranged to perform communications with the host device;

wherein:

the memory controller receives a first command from the host device through the transmission interface circuit of the memory controller, wherein the first command carries at least one first logical address for indicating at least one first logical address region, and further carries a first indication for indicating that generating a data fragmentation degree of the at least one first logical address region is requested;

in response to the first command from the host device, the memory controller performs discontinuity-related calculation according to a plurality of first physical addresses of at least one first physical address region to generate a discontinuity-related calculation result of the plurality of first physical addresses, and generates the data fragmentation degree according to the discontinuity-related calculation result, wherein the at least one first physical address region is associated with the at least one first logical address region, and the discontinuity-related calculation result indicates a degree of discontinuity of the plurality of first physical addresses;

after generating the data fragmentation degree is completed, the memory controller sends a first response to the host device through the transmission interface circuit, wherein the first response is sent to the host device in response to the first command;

the memory controller receives a second command from the host device through the transmission interface circuit, wherein the second command is arranged to indicate that returning the data fragmentation degree to the host device is requested; and in response to the second command from the host device, the memory controller sends a second response to the host device through the transmission interface circuit to return the data fragmentation degree to the host device, for selectively performing data fragmentation reduction according to a determination result of the host device, wherein the second response carries the data fragmentation degree, and the determination result is generated according to the data fragmentation degree returned to the host device.

13. The memory device comprising the memory controller of claim 12,
wherein the memory device comprises:
the NV memory, configured to store information; and
the memory controller, coupled to the NV memory, configured to control operations of the memory device.

14. An electronic device comprising the memory device of claim 13, and further comprising:
the host device, coupled to the memory device, wherein the host device comprises:
at least one processor, arranged for controlling operations of the host device; and
a power supply circuit, coupled to the at least one processor, arranged for providing power to the at least one processor and the memory device;
wherein the memory device provides the host device with storage space.

15. A method for performing data fragmentation reduction control of a memory device in a predetermined communications architecture with aid of fragmentation information detection, the method being applied to a host device coupled to the memory device, the memory device comprising a memory controller and a non-volatile (NV) memory, the NV memory comprising at least one NV memory element, the method comprising:
sending a first command from the host device to the memory controller through a transmission interface circuit of the host device, to trigger the memory controller to perform discontinuity-related calculation according to a plurality of first physical addresses of at least one first physical address region to generate a discontinuity-related calculation result of the plurality of first physical addresses, and generate a data fragmentation degree of at least one first logical address region according to the discontinuity-related calculation result, wherein the first command carries at least one first logical address for indicating the at least one first logical address region, and further carries a first indication for indicating that generating the data fragmentation degree of the at least one first logical address region is requested, wherein the at least one first physical address region is associated with the at least one first logical address region, and the discontinuity-related calculation result indicates a degree of discontinuity of the plurality of first physical addresses;

after generating the data fragmentation degree is completed, receiving a first response from the memory controller through the transmission interface circuit, wherein the first response is sent by the memory controller to the host device in response to the first command;

sending a second command from the host device to the memory controller through the transmission interface circuit, wherein the second command is arranged to indicate that returning the data fragmentation degree to the host device is requested;

receiving a second response from the memory controller through the transmission interface circuit, wherein the second response is sent by the memory controller to the host device in response to the second command to return the data fragmentation degree to the host device, and the second response carries the data fragmentation degree; and generating a determination result according to the data fragmentation degree returned to the host device, for controlling the memory controller to selectively perform data fragmentation reduction according to the determination result of the host device.

16. The method of claim 15, further comprising:
sending a third command from the host device to the memory controller through the transmission interface circuit, to trigger the memory controller to perform the data fragmentation reduction on at least one second physical address region, wherein the third command carries at least one second logical address for indicating at least one second logical address region among the at least one first logical address region, and further carries a third indication for indicating that performing the data fragmentation reduction on the at least one second logical address region is requested, wherein the at least one second physical address region is associated with the at least one second logical address region; and after performing the data fragmentation reduction on the at least one second physical address region is completed, receiving a third response from the memory controller through the transmission interface circuit, wherein the third response is sent by the memory controller to the host device in response to the third command.

17. The host device that operates according to the method of claim 15.

18. A non-transitory computer-readable medium storing a program code which causes the host device to operate according to the method of claim 15 when executed by the host device.

* * * * *